(12) United States Patent
Kusano (10) Patent No.: US 11,469,429 B2
(45) Date of Patent: Oct. 11, 2022

(54) FUEL CELL SYSTEM

(71) Applicant: TOYOTA JIDOSHA KABUSHIKI KAISHA, Toyota (JP)

(72) Inventor: Yuya Kusano, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 70 days.

(21) Appl. No.: 17/217,154

(22) Filed: Mar. 30, 2021

(65) Prior Publication Data

US 2021/0313602 A1  Oct. 7, 2021

(30) Foreign Application Priority Data

Apr. 7, 2020  (JP) .............................. JP2020-069087

(51) Int. Cl.
  *H01M 8/04* (2016.01)
  *H01M 8/04223* (2016.01)
  *H01M 8/04746* (2016.01)
  *H01M 8/0432* (2016.01)
  *H01M 8/0267* (2016.01)

(52) U.S. Cl.
  CPC ..... *H01M 8/04253* (2013.01); *H01M 8/0267* (2013.01); *H01M 8/04373* (2013.01); *H01M 8/04746* (2013.01); *H01M 2250/20* (2013.01)

(58) Field of Classification Search
  CPC ........... H01M 8/04253; H01M 8/0267; H01M 8/04746; H01M 2250/20
  USPC ........................................................ 429/437
  See application file for complete search history.

(56) References Cited

U.S. PATENT DOCUMENTS

| 6,432,568 B1 | 8/2002 | Salvador et al. |
| 2015/0221964 A1* | 8/2015 | Fellows ............ H01M 8/04029 429/429 |
| 2017/0338500 A1* | 11/2017 | Pryor .................... H01M 8/241 |
| 2018/0102558 A1* | 4/2018 | Noh ........................ B60L 58/34 |
| 2018/0277869 A1* | 9/2018 | Kusano ............... H01M 8/0258 |

FOREIGN PATENT DOCUMENTS

| JP | 2002-158024 A | 5/2002 |
| JP | 2019-021545 A | 2/2019 |

* cited by examiner

*Primary Examiner* — James M Erwin
(74) *Attorney, Agent, or Firm* — Oliff PLC (57) ABSTRACT

A fuel cell system ensures estimation on a cooling capacity by produced water in an intercooler when water is provided. A control device in a fuel cell system includes a freeze determination unit, a required pressure calculator, a discharge pressure setting unit, a power supplying unit, and a melting estimation unit. The freeze determination unit determines a freezing of produced water in an intercooler. The required pressure calculator calculates a pressure of air discharged from an air compressor. The discharge pressure unit sets the discharge air compressor to a melt pressure when the required pressure is the melt pressure or more. The power supplying unit performs power generation with the melt pressure for a melting period set to melt the frozen produced water, and supplies the generated power to the motor. The unit estimates the melting of the frozen water in the intercooler has completed after the melting period.

5 Claims, 5 Drawing Sheets

FUEL CELL SYSTEM

CROSS REFERENCE TO RELATED APPLICATIONS

The present application claims priority from Japanese patent application JP 2020-069087 filed on Apr. 7, 2020, the entire content of which is hereby incorporated by reference into this application.

BACKGROUND

Technical Field

The present disclosure relates to a fuel cell system.

Background Art

Conventionally, as this type of fuel cell system, there has been a fuel cell system that cools an air taken in from an air compressor by an intercooler using produced water produced through a power generation by a fuel cell stack (for example, see JP 2019-021545 A).

SUMMARY

Incidentally, in the fuel cell system disclosed in JP 2019-021545 A, the cooling performance of the intercooler depends on the amount of the produced water. Here, when the produced water freezes in the intercooler, the form of the cooling transitions in the order of a cooling by a latent heat of fusion, a cooling by a sensible heat of the produced water, and further, a cooling by a latent heat of vaporization. All these forms of the cooling are different in cooling efficiency. Accordingly, in the case of the intercooler that cools the air using the latent heat of vaporization, it is difficult to estimate the cooling performance of the intercooler unless the timing at which the cooling by the latent heat of vaporization becomes performable is obtained. Furthermore, since a pressure of the air supplied to the intercooler varies corresponding to an electric power required in the power generation, it is difficult to identify a time at which melting of the frozen produced water completes.

The present disclosure has been made in view of the above-described problem, and provides a fuel cell system that ensures more accurate determination on a cooling capacity by produced water in an intercooler even when the produced water in the intercooler freezes.

In consideration of the above-described problem, a fuel cell system according to the present disclosure comprises a fuel cell stack, an air compressor, an intercooler, a battery, and a control device. The fuel cell stack generates an electric power with an air and a fuel gas to supply the electric power to a motor. The air compressor supplies the air to the fuel cell stack. The intercooler is disposed between the air compressor and the fuel cell stack to cool the air supplied to the fuel cell stack. The battery stores the electric power generated by the fuel cell stack. The control device controls a pressure of the fuel gas supplied to the fuel cell stack and a discharge pressure of the air discharged from the air compressor to control an amount of power generation by the fuel cell stack. The intercooler stores produced water produced in the power generation by the fuel cell stack, transmits a heat of the air to the produced water via a wall portion of the intercooler, and cools the air by a latent heat of vaporization of the produced water. The control device includes a freeze determination unit, a required pressure calculator, a discharge pressure setting unit, a power supplying unit, and a melting estimation unit. The freeze determination unit determines a freezing of the produced water stored in the intercooler. The required pressure calculator calculates a required pressure of the air discharged from the air compressor corresponding to a required power amount required for the motor. The discharge pressure setting unit compares a melt pressure of the air discharged from the air compressor with the required pressure when the produced water is determined to be frozen, and sets the discharge pressure of the air compressor to the melt pressure when the required pressure is the melt pressure or more. The melt pressure is set to melt the freezing of the produced water. The power supplying unit causes the fuel cell stack to perform the power generation with the melt pressure for a melting period and supplies the generated power to the motor. The melting period is set to melt the frozen produced water. The melting estimation unit estimates that the melting of the frozen produced water in the intercooler has completed after an elapse of the melting period.

According to the present disclosure, when the freeze determination unit determines that the produced water is frozen, the discharge pressure setting unit compares the melt pressure set to melt the freezing of the produced water with the required pressure, and sets the discharge pressure of the air compressor to the melt pressure when the required pressure is the melt pressure or more. The power supplying unit causes the fuel cell stack to perform power generation with the set melt pressure for the melting period set to melt the frozen produced water.

After the elapse of the melting period equivalent to a time period of the power generation by the power supplying unit, the frozen produced water in the intercooler is completely melted by the heat of the air from the air compressor. Therefore, the melting estimation unit can accurately estimate the completion of the melting of the frozen produced water. Accordingly, since the temperature of the air cooled by the produced water in the intercooler can be accurately estimated after the elapse of the melting period, the cooling capacity by the produced water in the intercooler can be determined with more accuracy.

In some embodiments, the control device may include a power shortage calculator that calculates a power shortage amount insufficient relative to a required power amount in the power generation by the fuel cell stack with the melt pressure. The power supplying unit may supply the electric power generated with the melt pressure to the motor and supplies the electric power of the power shortage amount from the battery to the motor.

According to this aspect, since the power generation is performed with a pressure lower than the required pressure in the power generation by the fuel cell stack with the melt pressure, the required power required for the motor is insufficient. In this aspect, the power shortage calculator calculates the shortage of the electric power required for the motor, and the power supplying unit supplies the electric power from the battery to the motor together with the electric power generated by the fuel cell stack. Accordingly, the required power can be stably supplied to the motor.

In some embodiments, when a power amount stored in the battery is smaller than a specified value, the power supplying unit may inhibit the supply of the power shortage amount by the battery and may cause the fuel cell stack to perform the power generation with the melt pressure for the melting period, and the power supplying unit may store the generated power in the battery.

According to this aspect, in the power generation by the fuel cell stack with the melt pressure, the battery level is not sufficient when the power amount stored in the battery is smaller than the specified value. Therefore, the power supplying unit inhibits the supply of the power shortage amount by the battery. Furthermore, the power supplying unit causes the fuel cell stack to perform the power generation with the melt pressure for the melting period, and stores the generated power in the battery. In this period, while the supply of the generated power to the motor is restricted, the electric power generated by the fuel cell stack is assigned to the storing of the battery. Therefore, the electric power generated by the fuel cell stack can be efficiently used.

In some embodiments, the melt pressure may be set such that a melting temperature of the air discharged from the air compressor with the melt pressure becomes a temperature lower than a heat-resistant temperature of an electrolyte membrane included in the fuel cell stack.

According to this aspect, the temperature of the air discharged from the air compressor with the melt pressure becomes a temperature lower than the heat-resistant temperature of the electrolyte membrane included in the fuel cell stack, the deterioration of the electrolyte membrane can be suppressed.

In some embodiments, the freeze determination unit may determine the freezing of the produced water based on an external temperature. According to this aspect, since the freezing of the produced water is determined based on the external temperature, the freezing of the produced water can be determined with a simpler device configuration without disposing a temperature sensor in the intercooler.

According to the present disclosure, even when the produced water in the intercooler freezes, the cooling capacity by the produced water in the intercooler can be estimated with more accuracy.

DETAILED DESCRIPTION

The following describes one embodiment of a fuel cell system according to the present disclosure in detail based on the drawings.

Figure 1:
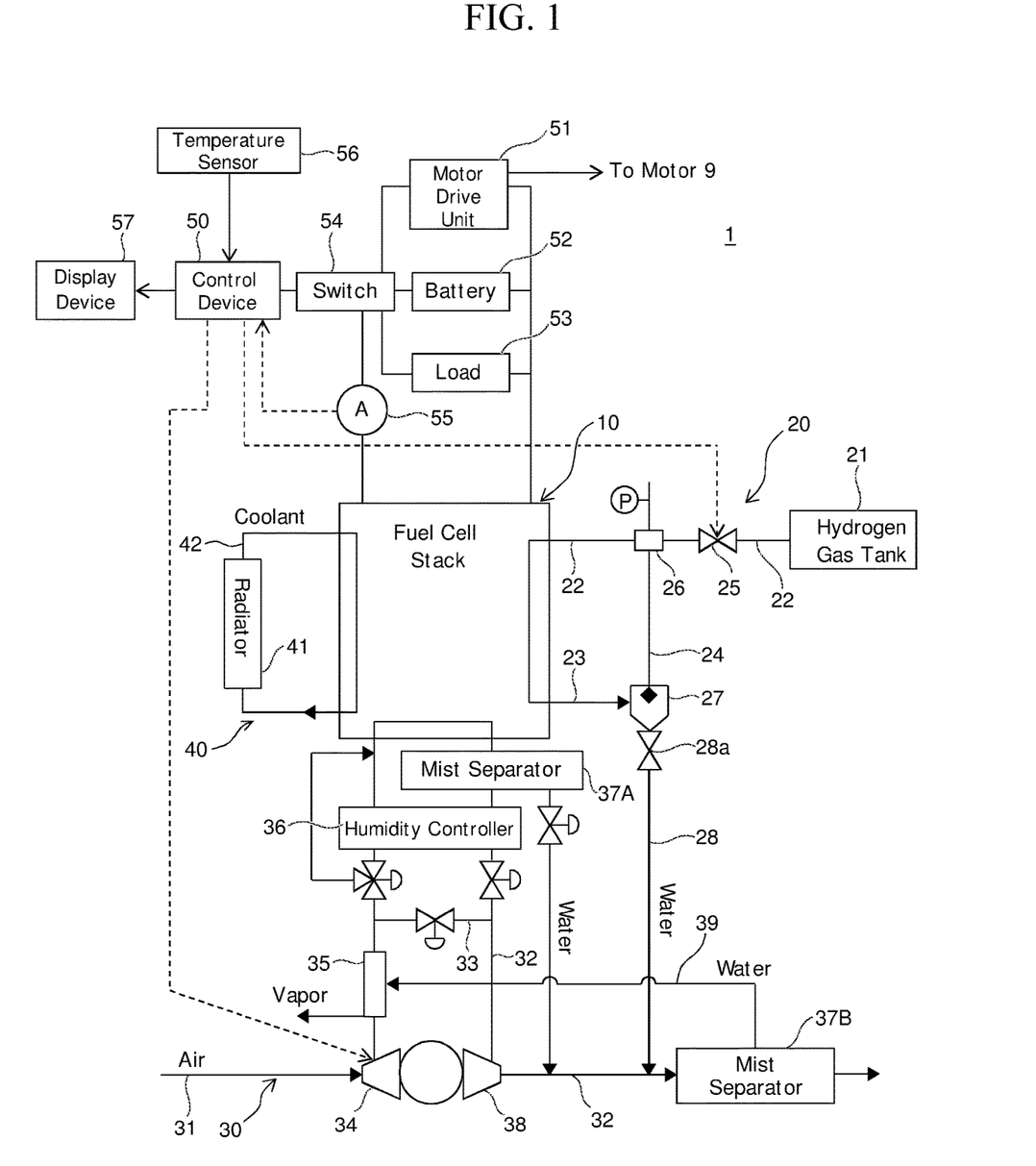
FIG. 1 is a schematic diagram schematically illustrating a system configuration of one embodiment of a fuel cell system according to the present disclosure.

In FIG. 1, for example, a fuel cell system 1 is mounted in a fuel cell vehicle and used as a power source for driving. The fuel cell system 1 of the embodiment includes at least a fuel cell stack 10, a fuel gas system 20, an oxidant gas system 30, a coolant system 40, and a control device 50. The fuel cell stack 10 is a solid polymer fuel cell stack, and other types of fuel cell, such as a solid oxide fuel cell, may be employed for the fuel cell stack 10 not limited to the solid polymer fuel cell.

1. Fuel Cell Stack 10 of Fuel Cell System 1

Figure 2:
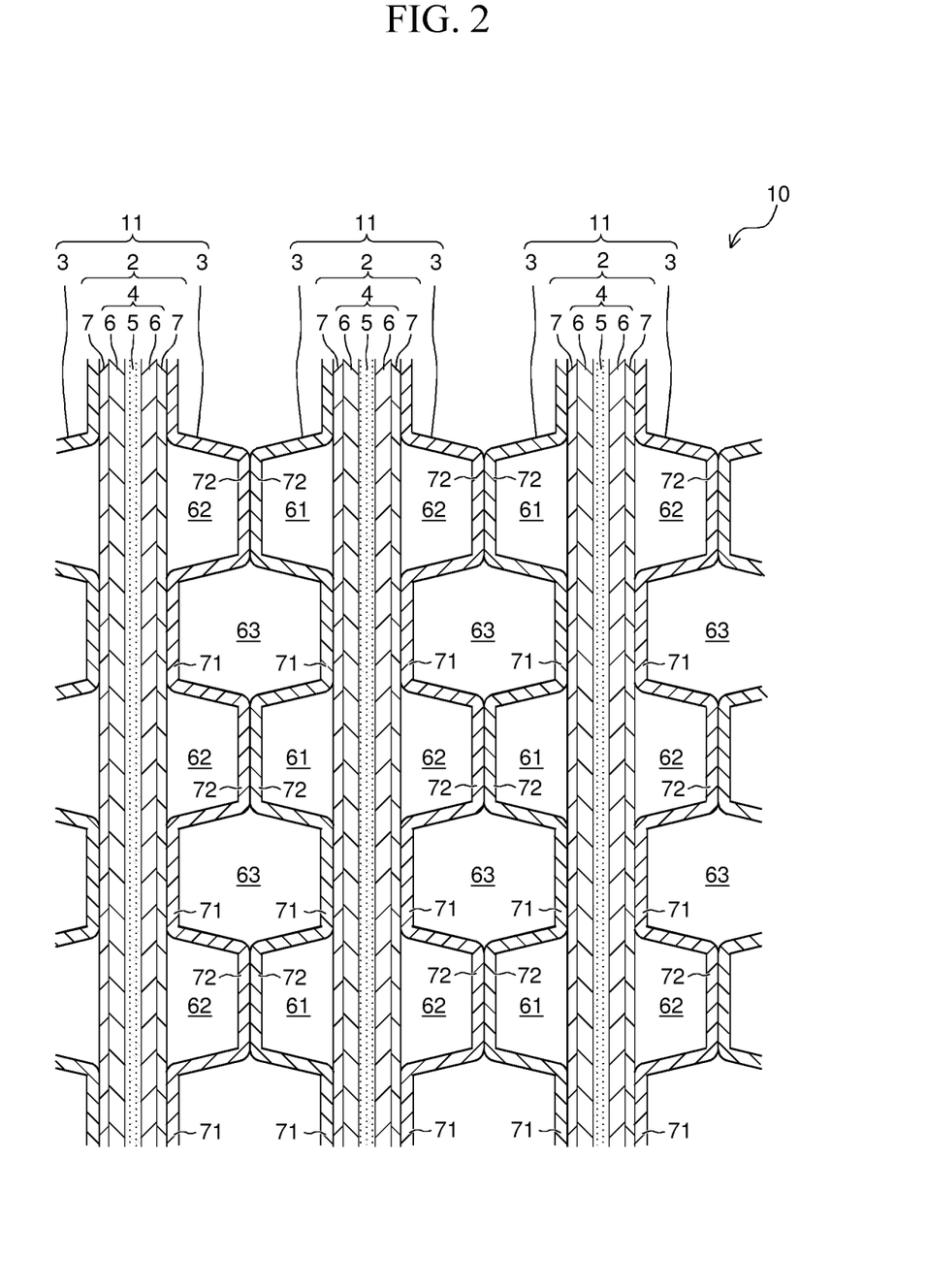
FIG. 2 is a schematic cross-sectional view of a fuel cell stack illustrated in FIG. 1.

FIG. 2 is a schematic cross-sectional view of a main part of the fuel cell stack 10. As illustrated in FIG. 2, in the fuel cell stack 10, produced water is produced in a power generation using an air and a hydrogen gas, and discharged. In the fuel cell stack 10, a plurality of cells (single cells) 11 as basic units are laminated. The cells 11 are each a solid polymer fuel cell that generates an electromotive force by an electrochemical reaction of an air that serves as an oxidant gas and hydrogen gas that serves as a fuel gas. The cell 11 includes a Membrane Electrode & Gas Diffusion Layer Assembly (MEGA) 2 and separators 3 that are in contact with the MEGAs (power generation units) 2 so as to partition the MEGAs 2. In this embodiment, the MEGA 2 is sandwiched between a pair of separators 3, 3.

The MEGA 2 is made by integrating a Membrane Electrode Assembly (MEA) 4 and gas diffusion layers 7 and 7, which are disposed on both sides of the Membrane Electrode Assembly 4. The Membrane Electrode Assembly 4 includes an electrolyte membrane 5 and a pair of electrodes 6, 6 assembled to sandwich the electrolyte membrane 5. The electrolyte membrane 5 includes a proton-conductive ion exchange membrane formed of a solid polymer material. The electrode 6 is formed of, for example, a porous carbon material carrying a catalyst, such as platinum. The electrode 6 disposed on one side of the electrolyte membrane 5 becomes an anode and the electrode 6 on the other side becomes a cathode. The gas diffusion layer 7 is formed of a conductive member with gas permeability, which includes a carbon porous body, such as a carbon paper or a carbon cloth, or a metal porous body, such as a metal mesh or a porosity metal.

In this embodiment, the MEGA 2 is a power generation unit of the fuel cell stack 10. The separator 3 is in contact with the gas diffusion layer 7 of the MEGA 2. When the gas diffusion layer 7 is omitted, the Membrane Electrode Assembly 4 serves as the power generation unit, and in this case, the separator 3 is in contact with the Membrane Electrode Assembly 4. Accordingly, the power generation unit of the fuel cell stack 10 includes the Membrane Electrode Assembly 4 and is in contact with the separator 3. The separator 3 is a plate-shaped member that uses a metal excellent in conductivity, gas impermeability, and the like as a substrate. A contact portion 71 on its one surface side abuts on the gas diffusion layer 7 of the MEGA 2, and a contact portion 72 on the other surface side abuts on another surface side of another adjacent separator 3. The contact portions 71, 72 are power collection portions in which an electric power generated by the MEGA 2 as the power generation unit is collected.

In this embodiment, the separator 3 are each formed into a wave form. The shape of the separator 3, the wave shape, forms an isosceles trapezoid and a top portion of the wave shape is flat. This top portion has both ends forming equal angles to provide angular shapes. That is, the separators 3 each have an approximately same shape whether it is viewed from a front side or a back side, and the top portions (projecting portion) are the contact portions 71, 72 of the separator 3. Specifically, the contact portions 71 as the top portions of the separator 3 are in surface contact with one gas diffusion layer 7 of the MEGA 2, and the contact portions 72 as the top portions of the separator 3 are in surface contact with the other gas diffusion layer 7 of the MEGA 2.

A gas flow channel 61 defined between the gas diffusion layer 7 on one electrode (namely, the anode) 6 side and the separator 3 is a channel through which a fuel gas flows. A gas flow channel 62 defined between the gas diffusion layer 7 on the other electrode (that is, the cathode) 6 side and the separator 3 is a channel through which an oxidant gas flows. When the fuel gas is supplied to the one gas flow channel 61, which is opposed to the other via the cell 11, and the oxidant gas is supplied to the other gas flow channel 62, an electrochemical reaction occurs inside the cell 11 to generate an electromotive force.

Furthermore, one cell 11 and another cell 11 adjacent thereto are disposed such that the electrode 6 as the anode and the electrode 6 as the cathode mutually face. The contact portions 72 on a back surface side of the separator 3 disposed along the electrode 6 as the anode of the one cell 11 are in surface contact with the contact portions 72 on the back surface side of the separator 3 disposed along the electrode 6 as a cathode of the other cell 11. Water as a coolant to cool the cells 11 flows through a space 63 defined between the separators 3, 3 that are in surface contact between the adjacent two cells 11.

2. Fuel Cell System 1

Referring again to FIG. 1, the overall configuration of the fuel cell system 1 will be described. The fuel gas system 20 described above is a channel to supply a hydrogen gas as the fuel gas to the fuel cell stack 10, and includes at least a hydrogen gas tank 21, a hydrogen gas supply channel 22, a hydrogen gas discharge channel 23, a hydrogen gas circulation channel 24, a variable pressure regulating valve 25, an injector 26, and a gas-liquid separator 27. The hydrogen gas supply channel 22 includes a hydrogen gas pump and the like (not illustrated). The hydrogen gas tank 21 is a storage tank that stores the hydrogen gas as the fuel gas.

The hydrogen gas stored in the hydrogen gas tank 21 is decompressed by the variable pressure regulating valve 25, and supplied to the hydrogen gas supply channel 22, which is connected to a fuel gas channel in the cells of the fuel cell stack 10, via the injector 26. The variable pressure regulating valve 25 sets the pressure of the hydrogen gas corresponding to an amount of power generation (power amount) required for the fuel cell stack 10.

The hydrogen gas discharge channel 23 is a channel through which a hydrogen off-gas in which hydrogen is consumed in the fuel cell stack 10 flows. The hydrogen gas circulation channel 24 is connected to the hydrogen gas discharge channel 23 and a portion of the hydrogen gas supply channel 22 on the downstream side with respect to the injector 26. The hydrogen gas circulation channel 24 recirculates a hydrogen off-gas in which water is separated by the gas-liquid separator 27 to the hydrogen gas supply channel 22.

Therefore, in the fuel cell system 1, while the hydrogen is consumed by the power generation, the hydrogen gas is circulated through the hydrogen gas discharge channel 23, the hydrogen gas circulation channel 24, a part of the hydrogen gas supply channel 22, and a channel for the hydrogen gas disposed inside the fuel cell stack 10 by the hydrogen gas pump (not illustrated).

The gas-liquid separator 27 disposed in a connecting portion between the hydrogen gas discharge channel 23 and the hydrogen gas circulation channel 24 has a function of separating water from a gas (hydrogen, nitrogen, and the like) in the hydrogen off-gas. The hydrogen not consumed by the power generation in the hydrogen off-gas is separated by the gas-liquid separator 27 and circulated to the hydrogen gas supply channel 22 by the hydrogen gas pump. The water and impurities separated by the gas-liquid separator 27 are discharged outside from a hydrogen gas release channel 28, which includes a purge valve 28a connected to the gas-liquid separator 27, passing through an oxidation gas discharge channel 32.

The oxidant gas system 30 is a channel to supply an air to the fuel cell stack 10, and includes an oxidation gas supply channel 31, the oxidation gas discharge channel 32, and a bypass channel 33. On the oxidation gas supply channel 31, at least an air compressor 34, an intercooler 35, and a humidity controller 36 are disposed. The air compressor 34 supplies the air obtained by compressing the atmosphere to the fuel cell stack 10. The intercooler 35 is disposed between the air compressor 34 and the fuel cell stack 10, and has a function of cooling the air that has become high temperature (for example, a temperature exceeding 100° C.) due to the compression by the air compressor 34. The intercooler 35 will be described later in detail.

The oxidation gas discharge channel 32 is a channel to discharge an oxygen off-gas in which oxygen is consumed in the fuel cell stack 10. The oxidation gas discharge channel 32 includes a mist separator 37A that collects water in the oxygen off-gas from the upstream side, and the humidity controller 36 disposed to the oxidation gas supply channel 31 is connected to the downstream side of the mist separator 37A. The water contained in the oxygen off-gas is produced water produced in the power generation by the fuel cell stack 10. The humidity controller 36 controls humidity of the air in the entering side of the fuel cell stack 10 and the air in the exiting side of the fuel cell stack 10. The water collected by the mist separator 37A is discharged to the downstream side of the oxidation gas discharge channel 32 via a water stop valve.

On the downstream side of the humidity controller 36, an expander 38 and a mist separator 37B are disposed. The expander 38 internally includes a turbine that rotates when the oxygen off-gas passes through, and has a function of assisting the air compression by supplying a power generated by the rotation to the air compressor 34. Water of an air off-gas that has passed through the expander 38, the water collected by the mist separator 37A, and the water separated by the gas-liquid separator 27 flow in the mist separator 37B passing through the oxidation gas discharge channel 32, and the mist separator 37B stores them as the produced water.

The produced water stored in the mist separator 37B is supplied to the intercooler 35 passing through a pipe 39 connected from the mist separator 37B to the intercooler 35. The produced water supplied to the intercooler 35 is internally stored.

When the air compressor 34 starts, the intercooler 35 transmits a heat (for example, a heat of the air more than 100° C.) of the air from the air compressor 34 to the produced water via a wall portion of the intercooler 35, thus cooling the air by a latent heat of vaporization of the produced water. The pipe 39 may include a pump (not illustrated) that supplies the produced water stored in the mist separator 37B to the intercooler 35, and a muffler (not illustrated) may be disposed at a downstream end of the mist separator 37B.

The air passing through the intercooler 35 is humidified by the humidity controller 36 disposed in its downstream side, and supplied to the fuel cell stack 10. The humidity controller 36 is disposed to extend over the oxidation gas supply channel 31 and the oxidation gas discharge channel 32, and a part of the produced water of the fuel cell stack 10 stored in the mist separator 37A disposed to the oxidation gas discharge channel 32 flows in the humidity controller 36.

Figure 3:
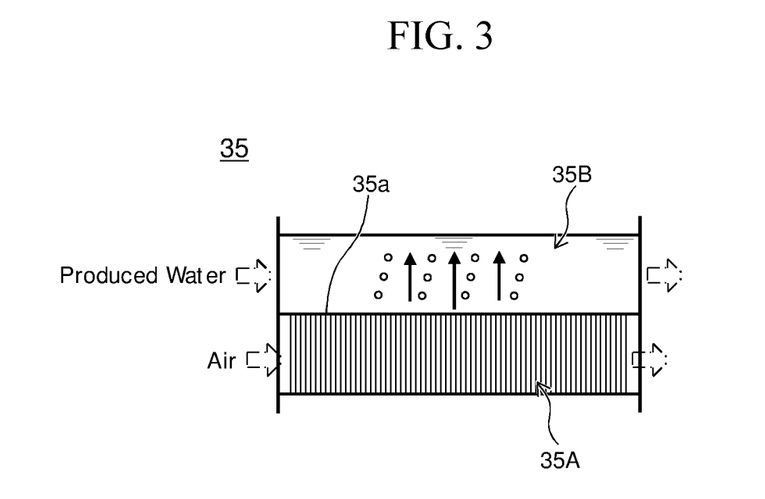
FIG. 3 is a schematic diagram illustrating a schematic configuration of an intercooler used in the fuel cell system of FIG. 1.

As illustrated in a schematic diagram of FIG. 3 illustrating the schematic configuration, the intercooler 35 has a structure in which a channel 35A, through which the air heated by the air compressor 34 passes, is separated from a storage portion 35B, in which the produced water lower than the air in temperature is stored, via a wall portion 35a of the intercooler 35. The channel 35A includes multiple fins formed of a metal plate material, and the air compressed by the air compressor 34 to become high temperature passes between the fins. In this embodiment, the heat exchange via the wall portion 35a of the intercooler 35 cools the high temperature air while the produced water is vaporized into vapor. That is, the intercooler 35 cools the air by the latent heat of vaporization of the produced water. The produced water produced in the power generation by the fuel cell stack 10 flows into the storage portion 35B from the fuel cell stack 10 via the mist separator 37B to be stored. In this embodiment, when the produced water becomes a predetermined storage amount or more (becomes a full water state), the produced water is discharged from the storage portion 35B.

The produced water stored in the intercooler 35 possibly freezes at the external temperature of 0° C. or less during the stop of the fuel cell system 1. In the fuel cell system 1 of this embodiment, the control device 50 described later performs the control to melt the frozen produced water by the heat of the air of the air compressor 34.

The coolant system 40 includes a radiator 41, a coolant channel 42 that circulates the coolant in the radiator 41 and the coolant channel in the fuel cell stack 10, and a coolant pump (not illustrated). The coolant system 40 has a function to cool inside the fuel cell stack 10 by circulating the coolant through the coolant channel 42 to emit the heat by the radiator 41.

The fuel cell system 1 includes the control device 50 that controls the amount of power generation performed by the fuel cell stack 10. The control device 50 includes a microcomputer, and includes a CPU, a ROM, a RAM, and an input/output port. The control device 50 is connected to a switch 54 that controls a motor drive unit 51, a battery 52, and a load 53. The switch 54 is connected to the fuel cell stack 10 via an ammeter 55. The ammeter 55 measures a current value output from the fuel cell stack 10.

The control device 50 receives a detected value by the ammeter 55, and controls a pressure of the hydrogen gas supplied to the fuel cell stack 10 and a discharge pressure of the air discharged from the air compressor 34, thereby controlling the amount of power generation by the fuel cell stack 10. The pressure of the hydrogen gas is controlled by controlling the variable pressure regulating valve 25 disposed in the fuel gas system 20 by the control device 50. The discharge pressure of the air discharged from the air compressor 34 is controlled by adjusting the output of the air compressor 34 by the control device 50.

In this embodiment, the fuel cell system 1 includes a temperature sensor 56 that detects the external temperature. The detected value of the temperature sensor 56 is input to the control device 50. As described later, at the external temperature of 0° C. or less, the control device 50 determines that the produced water stored in the intercooler 35 is frozen.

The motor drive unit 51 is an electric circuit that has a function to drive a motor 9 of a fuel cell vehicle (not illustrated) using the electric power generated by the fuel cell stack 10. In this fuel cell system 1, the battery 52 and the load 53 are connected in parallel to the motor drive unit 51. The battery 52 stores a surplus power generated by the fuel cell stack 10 when the electric power consumed by the motor drive unit 51 is smaller than the electric power output from the fuel cell stack 10. When the electric power is sufficiently stored, the battery 52 supplies the electric power to the motor drive unit 51. In a state where the battery 52 is fully charged, the load 53 consumes the surplus power when there is still the surplus power. The switch 54 switches the supply of the electric power between the fuel cell stack 10, the motor drive unit 51, the battery 52, and the load 53.

3. Control Device 50

Figure 5:
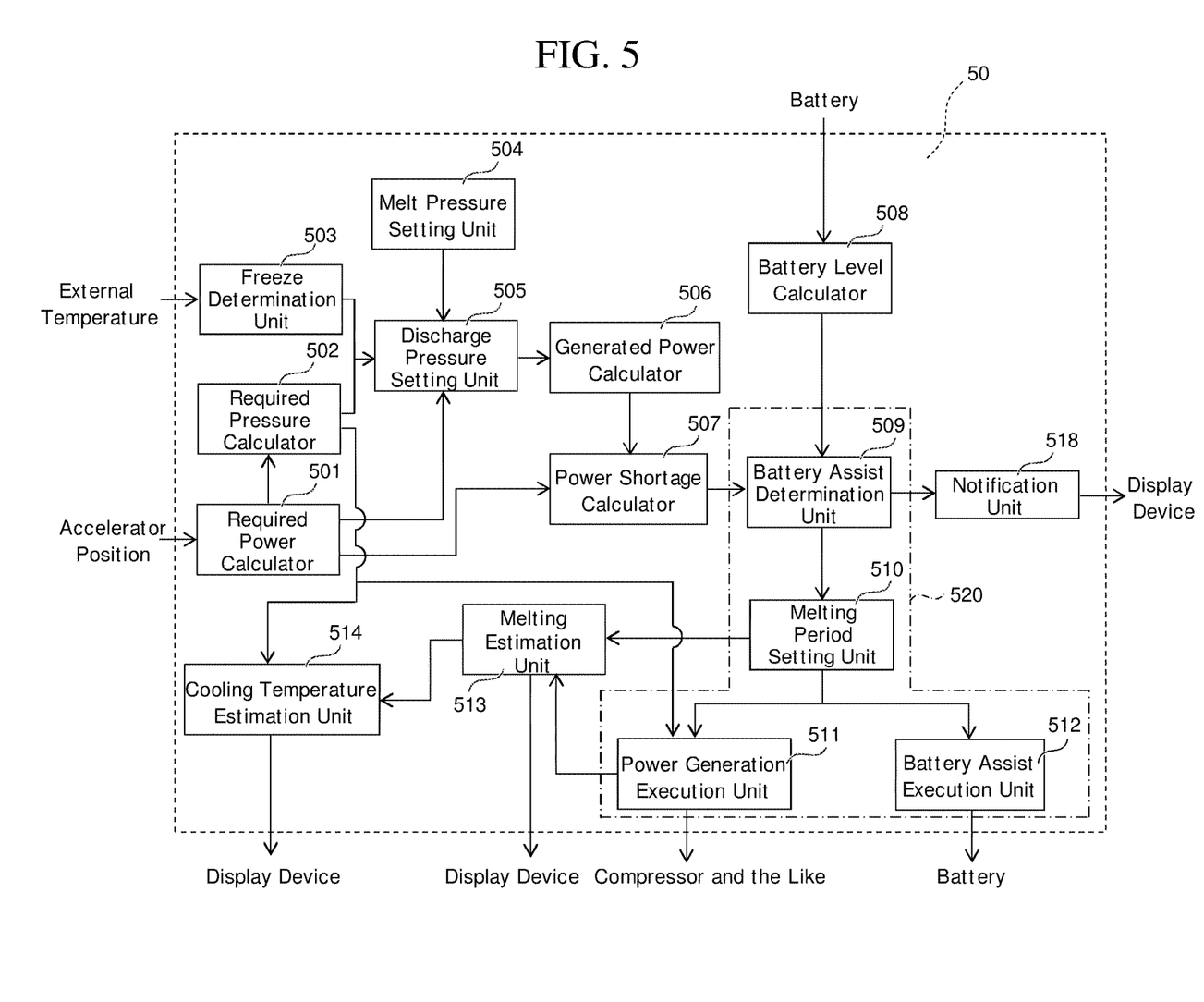
FIG. 5 is a control block diagram of a control device of the fuel cell system illustrated in FIG. 1.

The following describes the control device 50 of the fuel cell system 1 by referring to FIG. 5. FIG. 5 is a control block diagram of the control device 50, and a control block diagram for performing a control from the freezing to the melting of the produced water in the intercooler 35.

The fuel cell system 1 according to this embodiment is mounted to a fuel cell vehicle (not illustrated), and the power source of the fuel cell vehicle is the motor 9. In the fuel cell system 1, the electric power generated by the fuel cell stack 10 and the electric power stored in the battery 52 are supplied to the motor 9, thereby driving the motor 9.

Specifically, the control device 50 receives an accelerator position corresponding to a depression amount of an accelerator pedal of a driver. The accelerator position is detected by an accelerator position sensor (not illustrated).

As illustrated in FIG. 5, the control device 50 includes a required power calculator 501 and a required pressure calculator 502. The required power calculator 501 calculates an output required for the motor 9 corresponding to a detection signal of the accelerator position input to the control device 50, and calculates the required power required for the motor 9 corresponding to the output. While the required power calculator 501 calculates the required power required for the motor 9 based on the accelerator position in this embodiment, for example, the required power required for the motor 9 may be calculated from a target vehicle speed, a target acceleration, and the like when the fuel cell vehicle runs autonomously.

The required pressure calculator 502 calculates a required pressure of the air discharged from the air compressor 34 corresponding to the required power amount calculated by the required power calculator 501, and calculates a required pressure of the fuel gas (hydrogen gas) supplied to the fuel cell stack 10. When the produced water stored in the intercooler 35 is not frozen, a value of the calculated required pressure is input to a power generation execution unit 511 described later. The power generation execution unit 511 outputs control signals to the variable pressure regulating valve 25 and the air compressor 34 to control the pressure of the fuel gas (hydrogen gas) via the variable pressure regulating valve 25 and control the discharge pressure of the air via the air compressor 34, thus having the calculated required pressure. Accordingly, the electric power corresponding to the required power amount can be supplied to the motor 9 by only the fuel cell stack 10 (without the assist by the battery 52).

Furthermore, the required pressure calculated by the required pressure calculator 502 is estimated by a cooling temperature estimation unit 514. The cooling temperature estimation unit 514 estimates a temperature of the air cooled by the intercooler 35. Specifically, the temperature of the air to be cooled is estimated corresponding to the required pressure from the temperature of the air discharged from the air compressor 34 illustrated in FIG. 4 and an amount of latent heat of vaporization of the produced water stored in the intercooler 35. Note that while not illustrated in FIG. 5, for example, when the temperature of the air is estimated to exceed a heat-resistant temperature of the electrolyte membrane 5, the power generation execution unit 511 of the control device 50 restricts the required pressure to decrease the temperature of the air discharged from the air compressor 34 to the heat-resistant temperature or less. Since the power amount supplied from the fuel cell stack 10 to the motor 9 becomes a shortage due to the restriction of the required pressure, a battery assist execution unit 512 controls the battery 52 to compensate the shortage of the power amount by the battery 52.

Incidentally, the produced water stored in the storage portion 35B of the intercooler 35 freezes when the fuel cell system 1 is not activated for a long time in a sub-zero environment in some cases. In this case, since the intercooler 35 is a cooler using the latent heat of vaporization of the produced water, it is difficult to estimate the temperature of the air that has passed through the intercooler 35 when the produced water is frozen. Especially, in a period until the melting of the frozen produced water completes, the estimation of the temperature of the air becomes more difficult because of a state of a coexistence of a solid and a liquid.

Therefore, in this embodiment, this respect is solved by disposing the following configuration illustrated in FIG. 5 to the control device 50. In this embodiment, the control device 50 includes a freeze determination unit 503 and a melt pressure setting unit 504. The freeze determination unit 503 determines the freezing of the produced water in the intercooler 35. The freeze determination unit 503 determines that the produced water stored in the intercooler 35 is frozen when the external temperature of the fuel cell vehicle detected by the temperature sensor 56 is 0° C. or less. Note that while the freezing of the produced water is determined based on the external temperature in this embodiment, for example, the temperature sensor 56 may be disposed in the bottom portion of the storage portion 35B of the intercooler 35 to directly measure the temperature of the produced water.

In the melt pressure setting unit 504, a pressure discharged from the air compressor 34 for melting the produced water is set. In this embodiment, the melt pressure is set to cause the melting temperature of the air discharged from the air compressor 34 with the melt pressure to be a temperature lower than the heat-resistant temperature of the electrolyte membrane 5 included in the fuel cell stack 10. The setting of the melt pressure can be obtained from a relationship between the melt pressure and the melting temperature.

Incidentally, the intercooler 35 performs the cooling using the latent heat of vaporization of the produced water, and the latent heat of vaporization (for example, 532 cal/g) of the produced water is greater than the latent heat of fusion (for example, 80 cal/g) of the produced water. Therefore, when the air exceeds 100° C., the efficient cooling is performable. Accordingly, when the produced water is frozen, since the air is cooled by the latent heat of fusion, the intercooler 35 fails to provide the original cooling capacity. However, by setting the melt pressure to the temperature lower than the heat-resistant temperature of the electrolyte membrane 5, deterioration of the electrolyte membrane 5 can be suppressed even when the original cooling capacity of the intercooler 35 cannot be sufficiently provided.

In this embodiment, the control device 50 further includes a discharge pressure setting unit 505, a generated power calculator 506, a power shortage calculator 507, a battery level calculator 508, a notification unit 518, a power supplying unit 520, a melting estimation unit 513, and a cooling temperature estimation unit 514. The power supplying unit 520 includes a battery assist determination unit 509, a melting period setting unit 510, the power generation execution unit 511, and the battery assist execution unit 512.

The discharge pressure setting unit 505 compares the melt pressure set by the melt pressure setting unit 504 with the required pressure calculated by the required pressure calculator 502 when the freeze determination unit 503 determines that the produced water is frozen. As a result, when the required pressure is equal to or more than the melt pressure, the discharge pressure setting unit 505 sets the discharge pressure of the air compressor 34 to the melt pressure. Here, for example, when the power generation at the required pressure is performed with the required pressure equal to or more the melt pressure, it is impossible to obtain how long it takes for completing the melting of the frozen produced water. In this embodiment, since the discharge pressure is set to the melt pressure as a constant pressure by the discharge pressure setting unit 505, the air at the stable temperature can be supplied from the air compressor 34. Note that when the required pressure is less than the melt pressure, the discharge pressure setting unit 505 does not set the discharge pressure of the air compressor 34. Thus, the power generation of the fuel cell stack 10 is inhibited until the required pressure becomes the melt pressure or more.

The generated power calculator 506 calculates the power amount generated by the fuel cell stack 10 based on the set discharge pressure (that is, melt pressure). Here, in this embodiment, since the melt pressure is set to the constant pressure, the power amount generated by the fuel cell stack 10 is also constant. Accordingly, the generated power calculator 506 may be omitted cause the power shortage calculator 507 to store the constant power amount.

In the discharge pressure setting unit 505, when the required pressure is greater than the melt pressure, the power generation with the melt pressure causes the shortage of the power amount generated by the fuel cell stack 10 relative to the required power amount. Therefore, the power shortage calculator 507 calculates the power shortage amount insufficient relative to the required power amount obtained by the required power calculator 501 in the power generation by the fuel cell stack 10 with the melt pressure.

The battery level calculator 508 calculates a remaining capacity (SOC: State of charge), which is a power amount stored in the battery 52, from the output voltage and the like of the battery 52. The battery assist determination unit 509 determines whether to secondarily supply the electric power stored in the battery 52 to the motor 9 by the power shortage amount obtained by the power shortage calculator 507 or not based on the remaining capacity on the premise that the power generation of the fuel cell system 1 is performed with the melt pressure.

In the melting period setting unit 510, a period (melting period) in which the frozen produced water melts in the storage portion 35B of the intercooler 35 is set. Here, the melting period is set to a time period, for example, in which when the produced water is frozen in the storage portion 35B in a full water state, the melting of the frozen produced water completes at the temperature of the air discharged from the air compressor 34 corresponding to the melt pressure.

In addition, for example, the melting period setting unit 510 may estimate a water amount of the produced water stored in the storage portion 35B from a history of the amount of power generation by the fuel cell stack 10 and a temperature history of the air discharged from the air compressor 34 and set a time period necessary for completing the melting of the frozen produced water as the melting period corresponding to the estimated water amount. Additionally, the melting period setting unit 510 may include a water flowmeter to measure the water amount of the produced water stored in the storage portion 35B, measure the water amount before the freezing, and set a time period necessary for completing the melting of the frozen produced water as the melting period corresponding to the water amount.

The power generation execution unit 511 causes the fuel cell stack 10 to perform the power generation with the melt pressure for the melting period set by the melting period setting unit 510. Specifically, the power generation execution unit 511 controls the pressure of the fuel gas via the variable pressure regulating valve 25 and controls the discharge pressure of the air via the air compressor 34 so as to have the calculated required pressure.

The battery assist execution unit 512 determines whether to secondarily supply the electric power of the battery 52 to the motor 9 or not based on the determination result of the battery assist determination unit 509. Specifically, when the battery assist determination unit 509 determines that the stored power amount is smaller than a specified value, the assist of the electric power by the battery 52 is not performed. Accordingly, the battery assist determination unit 509 inhibits the battery assist execution unit 512 described later from supplying the power shortage amount by the battery 52, and the notification unit 518 notifies a display device 57 of being in preparation of the running of the fuel cell vehicle by the motor 9. At the same time, for the melting period set by the melting period setting unit 510, the fuel cell stack 10 performs the power generation with the melt pressure while the battery 52 stores the generated power.

In this case, the supply of the generated power to the motor 9 is restricted, and the generated power is assigned to the charge of the battery 52. Accordingly, the electric power generated by the fuel cell stack 10 can be efficiently used (charged).

Meanwhile, when the remaining capacity (SOC) charged in the battery 52 is the specified value or more, the electric power generated with the melt pressure is supplied to the motor 9 by the power generation execution unit 511 described later for the melting period set by the melting period setting unit 510. At the same time, the battery assist execution unit 512 described later supplies the electric power from the battery 52 to the motor 9 by the power shortage amount. Thus, since the electric power required for the motor 9 by the amount of the shortage can be supplied from the battery to the motor 9, the required power can be stably supplied to the motor 9. Consequently, the stable running of the fuel cell vehicle can be ensured.

After the elapse of the melting period, the melting estimation unit 513 estimates that the melting of the frozen produced water in the intercooler 35 has completed. Upon receiving the result of the estimation that the melting of the frozen produced water has completed by the melting estimation unit 513, the cooling temperature estimation unit 514 estimates the temperature of the air cooled by the intercooler 35. Thus, even when the produced water in the intercooler 35 is frozen, the temperature of the air cooled by the produced water in the intercooler 35 is estimated after completely melting the produced water. Therefore, the cooling efficiency of the intercooler 35 can be obtained with more accuracy.

4. Performance of Fuel Cell System 1 in not Frozen Case

The performance of the fuel cell system 1 of this embodiment configured as described above will be described. In this description of the performance, in the fuel cell vehicle that includes the fuel cell system 1, the performance of the fuel cell system 1 in which the produced water is not frozen will be described. A start switch is turned ON to start the fuel cell system 1, and the fuel cell system 1 is put in the operating state. Here, when the produced water is not frozen (the external temperature is higher than 0° C.), the power generation execution unit 511 of the control device 50 controls the variable pressure regulating valve 25 of the fuel gas system 20, which supplies the hydrogen gas, corresponding to the required power, and supplies the hydrogen gas to the fuel cell stack 10 passing through the hydrogen gas supply channel 22.

The power generation execution unit 511 of the control device 50 controls the air compressor 34 of the oxidant gas system 30 that supplies the air, and supplies the air to the fuel cell stack 10 passing through the oxidation gas supply channel 31. Accordingly, the fuel cell stack 10 becomes the operating state in which the hydrogen gas flows through the channel in the anode side and the air flows through the channel in the cathode side while having the electrolyte membrane 5 interposed therebetween, and the electric power is generated by the chemical reaction inside the stack. Thus, the produced water is produced.

The hydrogen off-gas after the reaction enters the gas-liquid separator 27 passing through the hydrogen gas discharge channel 23 to be separated into water and gas, and the water enters the mist separator 37B passing through the hydrogen gas release channel 28 to be stored. The gas separated by the gas-liquid separator 27 is merged into the hydrogen gas supply channel 22 passing through the hydrogen gas circulation channel 24, is supplied to the fuel cell stack 10 again by the injector 26, and circulates.

The oxygen off-gas after the reaction enters the oxidation gas discharge channel 32, water is collected by the mist separator 37A, the humidity is adjusted by the humidity controller 36. The oxygen off-gas passes through the oxidation gas discharge channel 32 passing through the expander 38, and is discharged outside passing through the mist separator 37B. When the oxygen off-gas passes through the expander 38, a turbine (not illustrated) rotates to assist the rotation of the air compressor 34, thus performing the assist of compressing the air.

By the chemical reaction inside the fuel cell stack 10, the water collected by the mist separator 37A and the water separated by the gas-liquid separator 27 are stored as the produced water in the mist separator 37B passing through the oxidation gas discharge channel 32, and supplied to the intercooler 35 passing through the pipe 39. The produced water supplied to the intercooler 35 is stored in the storage portion 35B.

In the intercooler 35, the air compressed by the air compressor 34 to become high temperature is cooled by the supplied produced water. That is, as illustrated in FIG. 3, the air of the high temperature of approximately 200° C. passes through the channel 35A, and the wall surface of the interface becomes high temperature by the fins of the channel 35A. In the storage portion 35B, the produced water vaporizes to generate air bubbles. Due to the latent heat of vaporization, the high temperature air is cooled by the produced water.

Figure 4:
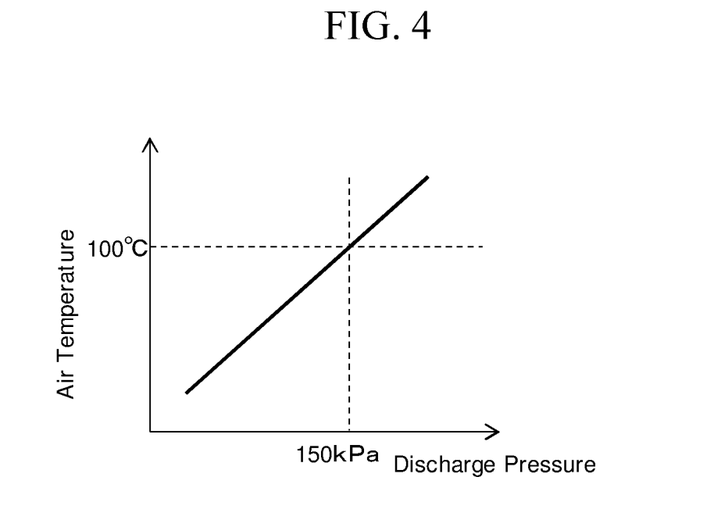
FIG. 4 is a map illustrating a relation between a pressure of an air discharged from an air compressor and a temperature in the fuel cell system of FIG. 1.

In the operating state in which the hydrogen gas and the air are supplied to the fuel cell stack 10 to cause the power generation state, in the relationship between the pressure of the air discharged from the air compressor 34 and the temperature of the air, as illustrated in a graph of FIG. 4, the temperature increases as the pressure increases. In the air compressor 34 of the fuel cell system 1 of this embodiment, for example, the pressure of the air is at the proximity of 150 kPA and the temperature of the air is approximately 100° C.

In FIG. 4, when the pressure is 150 kPA or more, the temperature of the air becomes 100° C. or more, and at this time, the produced water in the storage portion 35B of the intercooler 35 boils. Thus, by the latent heat of vaporization when the produced water boils to vaporize, the high temperature air of approximately 200° C. is cooled by the heat exchange.

5. Performance of Fuel Cell System 1 in Frozen Case

Figure 6:
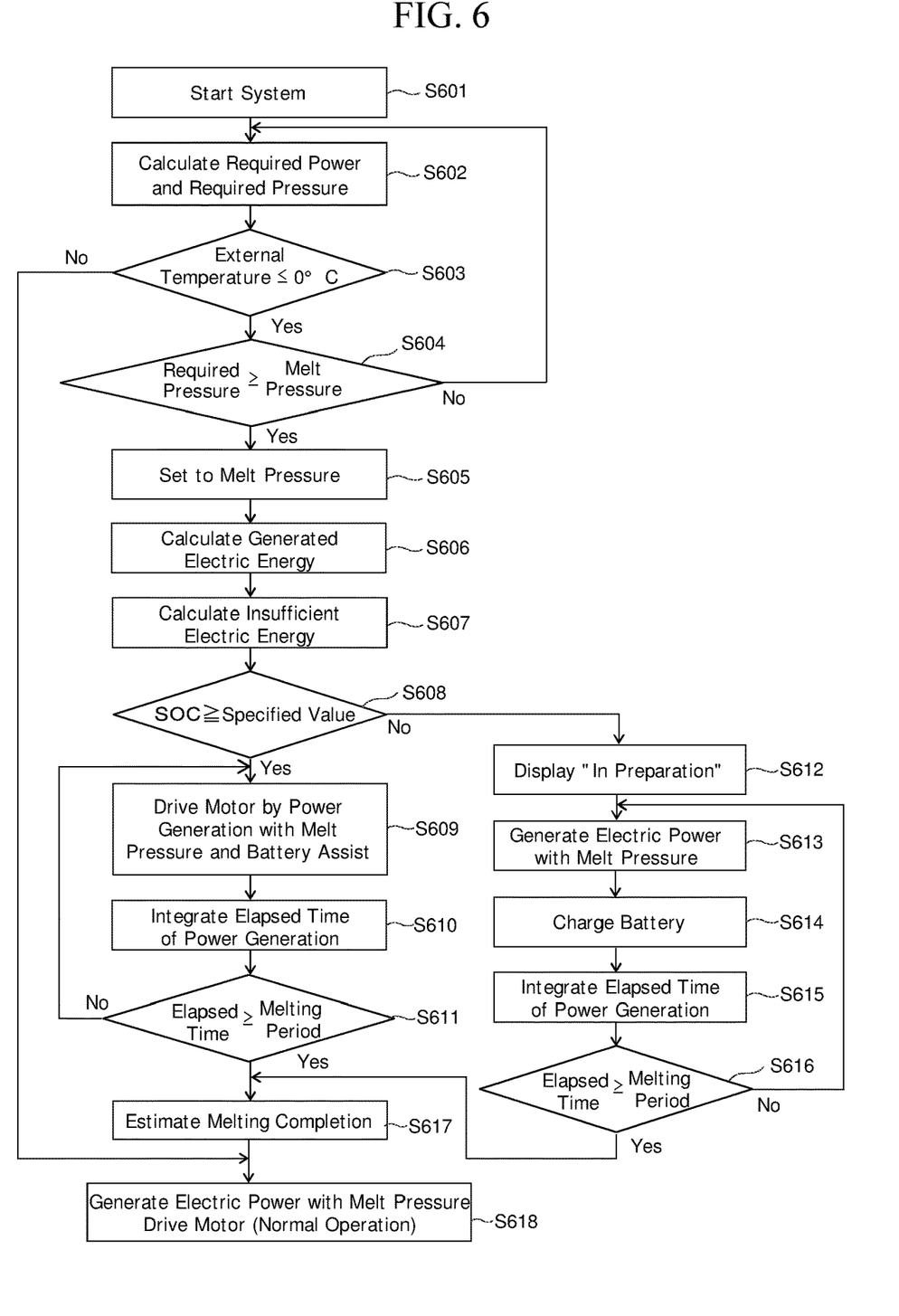
FIG. 6 is a flowchart illustrating an operation of the fuel cell system of FIG. 1.

The following describes the performance of the fuel cell system 1 when the produced water is frozen by referring to FIG. 6. First, in Step S601, the fuel cell system 1 is started similarly to the not frozen case. Next, in the control device 50, the required power calculator 501 and the required pressure calculator 502 calculates the required power required for the motor 9 and the required pressure of the air compressor 34 that supplies the air to the fuel cell stack 10.

Next, proceeding to Step S603, the freeze determination unit 503 determines whether the external temperatures when the fuel cell vehicle stops and when the fuel cell system 1 starts are 0° C. or less or not. When the external temperature is higher than 0° C., since the produced water in the intercooler 35 is not frozen, the control device 50 performs the above-described control of the not frozen case. That is, the process proceeds to Step S618.

When the external temperature is 0° C. or less in Step S603, the freeze determination unit 503 determines that the produced water in the intercooler 35 is frozen, and the process proceeds to Step S604. In Step S604, the discharge pressure setting unit 505 determines whether the required pressure of the air compressor 34 is the melt pressure or more or not. When the required pressure is the melt pressure or more, the process proceeds to Step S605, and the discharge pressure setting unit 505 sets the discharge pressure of the air compressor 34 to the melt pressure. Meanwhile, when the required pressure is smaller than the melt pressure, the process returns to Step S602.

In Step S606, the generated power calculator 506 calculates a generated power amount in the power generation by the fuel cell stack 10 with the melt pressure, and the process proceeds to Step S607. In Step S607, the power shortage calculator 507 calculates the power shortage amount insufficient relative to the required power amount in the power generation by the fuel cell stack 10 with the melt pressure, and the process proceeds to Step S608.

In Step S608, the battery assist determination unit 509 determines whether the remaining capacity (SOC) of the battery 52 is the specified value or more or not. Here, when the remaining capacity of the battery 52 is determined to be the specified value or more, the process proceeds to Step S609. In Step S609, the power supplying unit 520 holds the discharge pressure of the air compressor 34 to the melt pressure, supplies the electric power generated with the melt pressure to the motor 9, and supplies the electric power by the power shortage amount from the battery 52 to the motor 9. Accordingly, the shortage of the electric power from the fuel cell stack 10 generated with the melt pressure can be compensated with the electric power of the battery 52.

In Step S610, the power generation execution unit 511 integrates an elapsed time of the power generation by the fuel cell stack 10, and the process proceeds to Step S611. In Step S611, the melting estimation unit 513 determines whether the elapsed time of the power generation is the melting period or more or not, and the process proceeds to Step S617. In Step S617, the melting estimation unit 513 estimates that the melting of the frozen produced water in the intercooler 35 has completed when the elapsed time of the power generation is the melting period or more. Meanwhile, when the elapsed time of the power generation is less than the melting period, the process returns to Step S609 because the melting of the produced water possibly has not completed yet.

In Step S608, when the battery assist determination unit 509 determines that the remaining capacity of the battery 52 is less than the specified value, it can be determined that the desired power amount cannot be supplied to the motor 9 even when the electric power of the battery 52 is secondarily supplied to the motor 9, and the process proceeds to Step S612.

Accordingly, in Step S612, it is determined that the fuel cell vehicle cannot run, and "in preparation" is displayed on the display device 57 via the notification unit 518, thus advancing the process to Step S613. In Step S613, the power supplying unit 520 holds the discharge pressure of the air compressor 34 to the melt pressure and causes the fuel cell stack 10 to perform the power generation with the melt pressure, and the process proceeds to Step S614. In Step S614, supplying the electric power from the battery 52 to the motor 9 is inhibited, and the battery 52 stores the electric power generated by the fuel cell stack 10.

In Step S615, the power generation execution unit 511 integrates the elapsed time of the power generation by the fuel cell stack 10, and the process proceeds to Step S616. In Step S615, the melting estimation unit 513 determines whether the elapsed time of the power generation is the melting period or more or not, and the process proceeds to Step S617. In Step S617, the melting estimation unit 513 estimates that the melting of the frozen produced water in the intercooler 35 has completed when the elapsed time of the power generation is the melting period or more. Meanwhile, when the elapsed time of the power generation is less than the melting period, the process returns to Step S613 because the melting of the produced water possibly has not completed yet.

In Step S617, when the melting estimation unit 513 estimates that the melting of the frozen produced water in the intercooler 35 has completed, it can be determined that the air discharged from the air compressor 34 can be cooled by the latent heat of vaporization of the produced water in the intercooler 35. That is, the normal operation of the fuel cell system 1 in the not frozen state of the produced water can be performed.

Accordingly, in Step S618, the discharge pressure of the air compressor 34 is reset to the required pressure, thus performing the power generation of the fuel cell stack 10 with the required pressure and supplying the generated power to the motor 9. Consequently, the temperature of the air passing through the intercooler 35 can be accurately estimated by the cooling temperature estimation unit 514, thereby ensuring accurately obtaining the cooling capacity of the intercooler 35.

While the one embodiment of the present disclosure has been described in detail above, the present disclosure is not limited thereto, and can be subjected to various kinds of changes in design without departing from the spirit and scope of the present disclosure described in the claims.

In this embodiment, the battery assist determination unit inhibits the supply of the power shortage amount from the battery when the power amount stored in the battery is smaller than the specified value. However, the battery assist may be executed without the determination by the battery assist determination unit, for example, when the control device can store the electric power of the specified value or more in the battery with the electric power from the fuel cell system before a command of stopping the fuel cell system from the driver. In this case, the power shortage calculator and the battery assist determination unit can be omitted from the control device. Furthermore, when the fuel cell vehicle is allowed to run at a constant low speed by the power generation with the melt pressure, the battery assist execution unit can be omitted.

What is claimed is:

1. A fuel cell system comprising:
   a fuel cell stack that generates an electric power with an air and a fuel gas to supply the electric power to a motor;
   an air compressor that supplies the air to the fuel cell stack;
   an intercooler disposed between the air compressor and the fuel cell stack to cool the air supplied to the fuel cell stack;
   a battery that stores the electric power generated by the fuel cell stack; and
   a control device that controls a pressure of the fuel gas supplied to the fuel cell stack and a discharge pressure of the air discharged from the air compressor to control an amount of power generation by the fuel cell stack,
   wherein the intercooler stores produced water produced in the power generation by the fuel cell stack, transmits a heat of the air to the produced water via a wall portion of the intercooler, and cools the air by a latent heat of vaporization of the produced water, and
   wherein the control device includes:
     a freeze determination unit that determines a freezing of the produced water stored in the intercooler;
     a required pressure calculator that calculates a required pressure of the air discharged from the air compressor corresponding to a required power amount required for the motor;
     a discharge pressure setting unit that compares a melt pressure of the air discharged from the air compressor with the required pressure when the produced water is determined to be frozen, and sets the discharge pressure of the air compressor to the melt pressure when the required pressure is the melt pressure or more, the melt pressure being set to melt the freezing of the produced water;
     a power supplying unit that causes the fuel cell stack to perform the power generation with the melt pressure for a melting period and supplies the generated power to the motor, the melting period being set to melt the frozen produced water; and
     a melting estimation unit that estimates that the melting of the frozen produced water in the intercooler has completed after an elapse of the melting period.

2. The fuel cell system according to claim 1,
   wherein the control device includes a power shortage calculator that calculates a power shortage amount insufficient relative to a required power amount in the power generation by the fuel cell stack with the melt pressure, and
   wherein the power supplying unit supplies the electric power generated with the melt pressure to the motor and supplies the electric power of the power shortage amount from the battery to the motor.

3. The fuel cell system according to claim 2,
   wherein when a power amount stored in the battery is smaller than a specified value, the power supplying unit inhibits the supply of the power shortage amount by the battery and causes the fuel cell stack to perform the power generation with the melt pressure for the melting period, and the power supplying unit stores the generated power in the battery.

4. The fuel cell system according to claim 1,
   wherein the melt pressure is set such that a melting temperature of the air discharged from the air compressor with the melt pressure becomes a temperature lower than a heat-resistant temperature of an electrolyte membrane included in the fuel cell stack.

5. The fuel cell system according to claim 1,
   wherein the freeze determination unit determines the freezing of the produced water based on an external temperature.

* * * * *